May 7, 1929.  H. H. BOYCE  1,711,668
MOTOR HEAT INDICATOR
Filed April 29, 1927
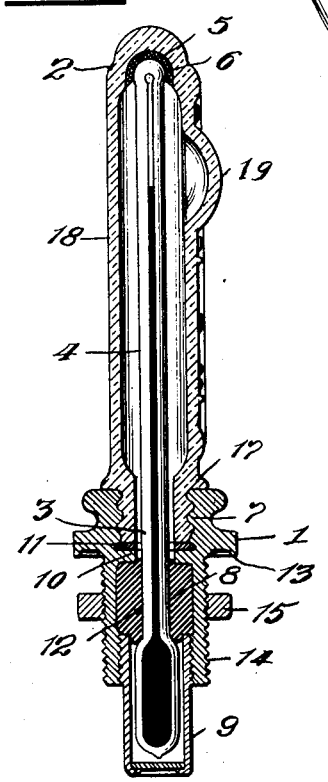
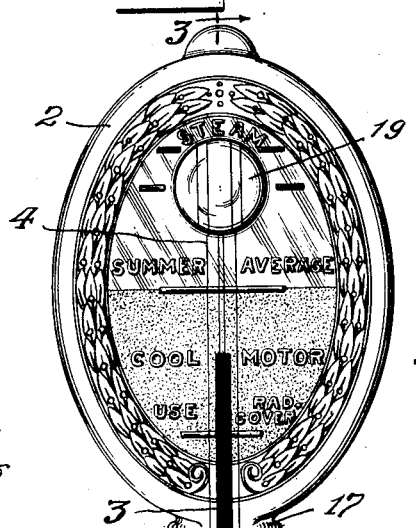
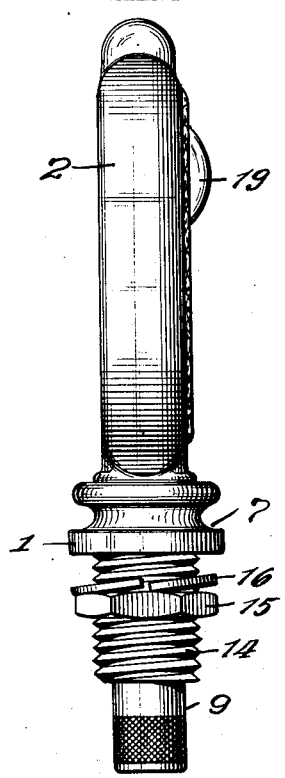
INVENTOR
HARRISON H. BOYCE
BY
ATTORNEY Patented May 7, 1929.

1,711,668

UNITED STATES PATENT OFFICE.

HARRISON HURLBERT BOYCE, OF JERICHO, NEW YORK.

MOTOR HEAT INDICATOR.

Application filed April 29, 1927. Serial No. 187,616.

This invention relates to devices for indicating the heat condition existing within an automotive radiator and particularly to a new and novel construction of the same.

One of the objects of this invention is to provide a unitary molded hollow casing for the indicating element of a device for indicating the heat condition within the space above the water in an automotive radiator.

Another object of the invention is to provide a casing for a motor heat indicator which is transparent or translucent throughout, giving better vision and illumination for the heat indicator both day and night.

Another object of this invention is to provide a simplified method of attaching the casing to a metallic base.

Another object of this invention is to provide an improved mounting for securing a heat indicating element in place in the base and casing.

Another object of this invention is to provide a combined device for indicating the heat condition within an automotive radiator and also the freezing point of the atmosphere surrounding the indicating device.

Another object of this invention is to provide a device for indicating the heat condition within an automotive radiator with a frosted background covering the lower portion of the indicating range of said indicating device.

Another object of this invention is to provide a heat indicating device for indicating the heat condition within an automotive radiator with a liquid or solid which undergoes a marked visible change at or near zero degrees centigrade, that is, near the freezing temperature of water.

Other objects and advantages of this invention will be apparent from the specification, claims, and appended drawings in which:

Figure 1 is an elevation view of my device.

Figure 2 is a side elevation view thereof, and,

Figure 3 is a cross-sectional view on the line 3—3 of Figure 1.

As will be readily seen from the drawings, my device consists essentially of three parts; a base portion 1, a hollow transparent or semi-transparent casing portion 2 of substantially flat bottle shape, and a heat responsive device 3, the indicating element 4 of which extends across the casing 2 where it is secured in a depression 5 by heat insulating material 6.

The base member 1 is constructed with a threaded aperture 7 in the upper end thereof and with an aperture 8 extending from the lower end in axial alinement with the aperture 7. The lower end of the aperture 8 is provided with threads to receive the cup 9. Between the apertures 7 and 8, an annular flange 10 is provided and on the upper side of this flange a gasket 11 is placed. On the lower side of this flange and snugly fitting in the aperture 8 is a compressible stopper member 12 of rubber, cork, or other suitable material surrounding and tightly gripping the stem of the heat responsive device 3. The cup 9 compresses the member 12 against the flange 10 thus forcing the member against the stem of the heat responsive device 3 and the walls of the aperture 8 thus sealing the passage thru the base member 1.

The base member 1 is also provided with a shoulder 13 and a downwardly projecting threaded stem 14 adapted to pass through an aperture in an automotive radiator closure device and be secured thereto with the shoulder abutting the outer surface of said closure device by a nut 15. A lock washer 16 is provided between the nut 15 and the inner surface of the closure device for the purpose of preventing the unscrewing of the nut 15 due to vibration.

The bottle shaped casing 2 is of a substantially flat elliptical form with the long axis vertical. The lower end or neck of the casing 2 is formed into a base 17. This base is threaded and is secured to the base member 1 by cooperation of these threads with the threads in the aperture 7 of the said base member 1. The base 17 seats against the gasket 11 and this provides a tight seal for the casing 2. The casing 2 may be made of glass, bakelite, or other suitable material and may be blown or molded or formed in any other suitable manner. As will be seen in Figs. 2 and 3 the back face 18 of the casing is substantially flat while the front face has a substantially flat oval portion surrounded by a band of ornamentation.

The indicating element 4 of the heat responsive device 3 extends across this oval portion substantially in line with the major axis thereof. The customary graduations and indicating words, such as, Steam, Summer average, Cool motor, Use radiator cover, etc., are molded in their appropriate location on the flat oval portion, as is shown in Figs. 1 and 3. Near the upper end of the indicating range of the indicating element 4 a convex portion 19 is formed on the flat oval portion of the front face to accentuate the reading of the indicating element in the range corresponding to a dangerous condition within the cooling system of an automotive engine. The lower half of the rear face 18 of the casing 2 is frosted or rendered translucent in any other suitable manner and the casing may be filled with a liquid or solid to a height substantially corresponding to the top of the frosted portion. The liquid or solid is, of course, maintained in the casing by virtue of the stopper member 12 and gasket 11, and is of a contrasting color, to the color of the temperature responsive column 4.

This liquid or solid is of such a nature as to give a visual indication either by change of color or form at or near zero degrees centigrade; also if desired this liquid or solid may be such as to become opaque or crystalline or subject to any other marked visual change at or near the freezing temperature of the cooling fluid in the cooling system thus indicating to the operator that the cooling system is in danger of freezing and that he should take proper steps to protect the system if left exposed with the engine idle.

A sharp division line between the indications above and below the Summer average is made by carrying the ground portion of the rear face 18 and also the height of the liquid or solid medium in the casing 2 to the Summer average graduation. The difference in appearance of the indicating liquid in the indicating element 4 of the heat responsive device above and below the Summer average will thus be rendered very marked and is readily distinguished by the operator even in poor light. If desired, the rear face 18 of the casing 2 may be left plain or it may be ground in order to increase the visibility of the indicating medium in the indicating element 4 or the rear face 18 may be left unground directly to the rear of the indicating element 4 thus increasing the illumination directly to the rear of the indicating element 4.

In the use of my invention the light from the sun or the light of the on coming automobiles will penetrate the casing on all sides, increasing the visibility of the heat indicating column and at the same time producing a highly desirable ornamental effect.

Various changes in the construction of the embodiment illustrated in the drawings may be made, and parts of the indicating portion may be used without others, without departing from the spirit of the invention, and I do not therefore desire to limit myself to the specific construction shown and described, but to interpret the invention broadly within the scope of the appended claims.

What I claim as my invention is:

1. In a device for indicating the condition within an automotive radiator, a base, a transparent casing closed at its lower end by said base, a heat responsive device in said base and having an indicating element extending into said casing, and a substance partially filling said casing and subject to visual changes upon certain changes in temperature whereby the appearance of the indication of the indicating element will be varied below the level of the substance in accordance with the visual changes of said substance.

2. In a device for indicating the condition within an automotive radiator, a base, a transparent casing closed at its lower end by said base, a heat responsive device in said base and having an indicating element extending into said casing, and a substance partially filling said casing and subject to visual changes near the freezing temperature of water whereby the appearance of the indication of the indicating element will be varied below the level of the substance in accordance with the visual changes of said substance.

3. In a device for indicating the condition within an automotive radiator, a heat responsive device having an indicating element, a casing for said indicating element formed with a transparent front face and a rear face transparent above a certain indication of the indicating element and translucent below such indication.

4. In a device for indicating the condition within an automotive radiator, a heat responsive device having an indicating element, a casing for said indicating element formed with a transparent front face having a magnifying area over the upper indicating range of the indicating element and a rear face transparent above the average summer indication of the indicating element and translucent below such indication.

5. A device for indicating the condition within an automotive radiator, including a heat responsive device having an indicating element, a casing for said indicating element formed with a transparent front face having a magnifying area over the upper indicating range of the indicating element and a rear face transparent above the average summer indication of the indicating element and translucent below such indication. and a substance filling said casing to the summer indication of the indicating element and subject to visual changes upon certain changes in temperature whereby the appearance of the indication of the indicating element will be varied below the level of the substance in accordance with the visual changes of said substance.

6. In a device of the class described, a heat responsive device having an indicating element, a molded transparent casing therefor, formed with a threaded neck and with a flat face having graduations and a magnifying portion formed thereon.

7. In an automotive heat indicating device, a base, a transparent casing closed at its lower end, a heat responsive device associated with said base and responsive to changes in heat condition with an automotive cooling system and having an indicating element extending into said casing, and a color changing heat responsive substance within said casing and surrounding said indicating element throughout a portion of the indicating range whereby the appearance of the indication in the range below the surface of the heat responsive substance will be varied in accordance with the color change.

8. In a device for indicating the condition within an automotive radiator, a heat responsive device having an indicating element, a hollow bottle-shaped casing for said indicating element formed with a transparent front face, and a rear face transparent above the average summer indication of the indicating element and translucent below such indication and means on the neck of said casing to secure it to a base.

In testimony whereof I have affixed my signature to this specification.

HARRISON H. BOYCE.